(12) United States Patent
Krug et al.

(10) Patent No.: US 10,181,060 B2
(45) Date of Patent: Jan. 15, 2019

(54) METHODS AND SYSTEMS FOR REAL TIME RFID LOCATING ONBOARD AN AIRCRAFT

(75) Inventors: William P. Krug, Kirkland, WA (US); Sudhakar S. Shetty, Mercer Island, WA (US); David T. Kirkland, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 605 days.

(21) Appl. No.: 12/632,501

(22) Filed: Dec. 7, 2009

(65) Prior Publication Data

US 2011/0133891 A1 Jun. 9, 2011

(51) Int. Cl.
*G06K 7/01* (2006.01)
*G06K 7/00* (2006.01)
(Continued)

(52) U.S. Cl.
CPC ....... *G06K 7/0008* (2013.01); *G06K 7/10079* (2013.01); *G06K 7/10316* (2013.01);
(Continued)

(58) Field of Classification Search
CPC ............. G06K 7/0008; G06K 7/10079; G06K 7/10346; G06K 7/10316; G06K 2017/0051; G06K 2017/0045
(Continued)

(56) References Cited

U.S. PATENT DOCUMENTS 5,534,869 A * 7/1996 Harman ............. G08B 13/2497
340/850

6,246,320 B1 * 6/2001 Monroe ........................ 340/506
(Continued)

FOREIGN PATENT DOCUMENTS

| EP | 1478106 A2 | 11/2004 |
|---|---|---|
| JP | 2004294338 A | 10/2004 |
| KR | 20080015974 A | 2/2008 |

OTHER PUBLICATIONS

Evans-Pughe, C.; Airport of the Future: Tracking People and Packages; IET Knowledge Network; Jul. 6, 2009; 2 pages.
(Continued)

*Primary Examiner* — Brian Wilson
(74) *Attorney, Agent, or Firm* — Armstrong Teasdale LLP (57) ABSTRACT

An aircraft communications and item tracking system is described. The system includes an RFID reader and a communications device located at fixed locations within the aircraft, a plurality of passive RFID tags operable for association with items within the aircraft, and a distributed antenna system comprising a plurality of antenna units and a wireless distribution system. The wireless distribution system is communicatively coupled to an aircraft communications network. The antenna units are communicatively coupled to the wireless distribution system and disbursed about the aircraft such that the RFID tags within the aircraft may be activated by signals output by at least one of the antenna units. The RFID reader and communications device are communicatively coupled to the wireless distribution system. The distributed antenna system is operable for transmission and reception of signals associated with the RFID reader and RFID tags. The distributed antenna system is further operable for transmission and reception of signals associated with the communications device.

26 Claims, 5 Drawing Sheets

(51) Int. Cl.
*G06K 7/10* (2006.01)
*G06K 17/00* (2006.01)

(52) U.S. Cl.
CPC . *G06K 7/10346* (2013.01); *G06K 2017/0045* (2013.01); *G06K 2017/0051* (2013.01)

(58) Field of Classification Search
USPC .............................. 340/10.1–10.6, 945–983
See application file for complete search history.

(56) References Cited

U.S. PATENT DOCUMENTS

| | | | | |
|---|---|---|---|---|
| 6,281,797 | B1* | 8/2001 | Forster et al. | 340/572.3 |
| 6,337,754 | B1* | 1/2002 | Imajo | 398/115 |
| 7,030,760 | B1* | 4/2006 | Brown | 340/568.1 |
| 7,242,259 | B2* | 7/2007 | Heide | G06K 19/0723 331/10 |
| 7,626,505 | B2* | 12/2009 | August et al. | 340/572.4 |
| 8,005,513 | B2* | 8/2011 | Risheq et al. | 455/571 |
| 2004/0145452 | A1* | 7/2004 | Fischer | G06K 7/10861 340/10.1 |
| 2006/0038077 | A1* | 2/2006 | Olin | B64D 9/00 244/137.1 |
| 2006/0246892 | A1* | 11/2006 | vonDoenhoff et al. | 455/427 |
| 2007/0001809 | A1* | 1/2007 | Kodukula | G06K 7/0008 340/10.1 |
| 2007/0257796 | A1 | 11/2007 | Easton et al. | |
| 2007/0273529 | A1* | 11/2007 | Lee | H01Q 1/2216 340/572.7 |
| 2007/0285239 | A1 | 12/2007 | Easton et al. | |
| 2007/0286599 | A1* | 12/2007 | Sauer | H04B 10/25754 398/28 |
| 2008/0100706 | A1* | 5/2008 | Breed | 348/143 |
| 2008/0240029 | A1* | 10/2008 | Lynch et al. | 370/329 |
| 2009/0105874 | A1* | 4/2009 | Tietjen et al. | 700/217 |
| 2009/0322488 | A1* | 12/2009 | Kanagala et al. | 340/10.3 |

OTHER PUBLICATIONS

Sabesan, S. et al.; Demonstration of Improved Passive UHF RFID Coverage Using Optically-Fed Distributed Multi-Antenna System; 2009 IEEE Conference on RFID; Apr. 27-28, 2009; Orlando, FL; 7 pages.
Crisp, M. et al.; Mixed Wireless Communications and RFIS Sensor Networks over Fibre; 2009 International TOpical Meeting on Microwave Photonics; Oct. 14-16, 2009; Valencia, Spain; 4 pages.
International Search Report and Written Opinion of PCT/US2010/058976; dated Feb. 25, 2011; 11 pages.
Notification of Reexamination for Chinese Patent Application No. 201080055491.X, Oct. 28, 2016, 23 pages.

* cited by examiner

METHODS AND SYSTEMS FOR REAL TIME RFID LOCATING ONBOARD AN AIRCRAFT

BACKGROUND

The field of the invention relates generally to the tracking and inventory of items on an aircraft, and more specifically, to methods and systems for real time RFID locating onboard an aircraft.

Existing inventory and tracking solutions based on active RFID and WiFi use signal strength measurements and time difference of arrival algorithms to determine location coordinates. More recently, broadband wireless location beacon signals have been used to overcome areas of poor WiFi coverage. One system uses a network of RFID readers and their dedicated processors and software to locate tags among a dedicated network of RFID readers. Another solution uses software controlled smart antennas to steer beams, and perform signal acquisition and source location using an array of elements, an array controller, plus an RFID reader module, weighing 50 to 85 lbs per antenna. Still another system requires placement of transmitters near tags and sophisticated signal processing to locate multiple tags with its long range phased array receiver.

Such systems have disadvantages and other limitations when applied to an aircraft environment. Specifically, such complex systems utilize components having significant weight or require significant computing resources for signal processing, which is always a concern or limitation in the aircraft environment. Although simpler system solutions can utilize active RFID tags, these active RFID tags are 1000 times more expensive per tag than passive RFID tags. Active RFID tags are at least one inch square in size, while passive RFID tags can be up to 1000 times smaller. Active RFID tags read by active RFID readers do have up to 100 times greater range than do passive RFID tags, when read by single passive RFID readers with single local transmit and receive antennas. However, the active RFID tags require tag batteries, and have very limited accuracy and resolution capabilities.

RFID systems that incorporate the less expensive passive RFID tags are complex, dedicated tracking solutions, with bulky and heavy smart antennas, as described above. Each tracking and communication solution requires a separate, dedicated wiring infrastructure. Digital networks of RFID tag readers have limited capabilities to estimate time difference of arrival for RFID tag location finding due to delays embedded in the digital network system solutions. Such delays are sometimes resolved through an array of networked short range passive RFID readers located at choke points though which the short range RFID tags pass to estimate real time locations of RFID tags.

There are aircraft applications that utilize active RFID technology, for example, to track aircraft parts and high value assets. Such applications are used primarily for intelligent inventory, and not location tracking.

BRIEF DESCRIPTION

In one aspect, an aircraft communications and item tracking system is provided. The system includes an RFID reader and a communications device located at fixed locations within the aircraft, a plurality of passive RFID tags operable for association with items within the aircraft, and a distributed antenna system comprising a plurality of individual transmission and reception points and a wireless distribution system. The wireless distribution system is communicatively coupled to an aircraft communications network. The transmission and reception points are communicatively coupled to the wireless distribution system and disbursed about the aircraft such that the plurality of RFID tags within the aircraft may be activated by signals output by at least one of the transmission points. The RFID reader and communications device are communicatively coupled to the wireless distribution system. The distributed antenna system is operable for transmission and reception of signals associated with the RFID reader and RFID tags. The distributed antenna system is further operable for transmission and reception of signals associated with the communications device.

In another aspect, a method is provided for tracking items on an aircraft where each item to be tracked is associated with at least one passive RFID tag. The method includes outputting an activation signal from a stationary RFID reader within the aircraft, the signal operable for activation of passive RFID tags, routing the activation signal from the RFID reader for transmission through transmission points of a distributed antenna system, individual transmission and reception points of the distributed antenna system dispersed within the aircraft, the distributed antenna system providing a communications capability for at least one other communications system, receiving, via the dispersed reception points, signals generated by the passive RFID tags activated by the transmitted activation signal, and routing the received signals through the distributed antenna system for interpretation by the RFID reader.

In still another aspect, an aircraft is provided. The aircraft includes a plurality of wireless communications devices deployed within the aircraft including at least one passive tag RFID reader, a wireless distribution system operative as a communications access point for the plurality of wireless communications devices, and a plurality of individual transmission and reception points communicatively coupled to the wireless distribution system. The wireless distribution system is operative to integrate a plurality of communications services over a common infrastructure. At least one of the communications services is associated with the at least one passive tag RFID reader and the transmission and reception points are disbursed within the aircraft such that a transmission pattern associated with the transmission and reception points is provided that allows for communications with passive RFID devices deployed within the aircraft.

The features, functions, and advantages that have been discussed can be achieved independently in various embodiments of the present invention or may be combined in yet other embodiments further details of which can be seen with reference to the following description and drawings.

DETAILED DESCRIPTION

Accurate, real time locating (RTLS) of low cost passive RFID tags onboard an aircraft provide an ability to locate, for example, passengers, baggage, confirm a full complement of life vests, maintain an inventory of portable onboard items, and enable physical position location mapping of totally wireless electronic devices (e.g. sensors) to logical network addresses for cabin services.

Embodiments are directed to an onboard passive RFID system based on a distributed antenna system (DAS) optimized to reduce nulls and increase received signal strengths throughout an aircraft. Such a system enables the identifying of items in a radio fingerprinted cabin, multi-antenna locating techniques to improve the absolute locating accuracy of passive RFID tags to within a single seat or seat group in one example. In addition, the utilization of the DAS provides a broadband system which allows a wide range of wireless communication services to be transmitted over a single distribution infrastructure. Incorporation of the DAS therefore allows remote integration of other onboard wireless data services such as WiFi and cell phone over such a common infrastructure. With such a system, simultaneous wireless communications and RFID coverage capabilities can be provided.

More generally, the described embodiments relate to the location of passive RFID tagged items in an aircraft cabin and cargo hold for inventory control of immobile items, mapping of physical location of totally wireless electronic devices to logical network addresses, and tracking of mobile passengers for purposes of associating those passengers with their mobile baggage and travel itineraries.

In embodiments, the passive RFID systems referred to herein refer to RFID tags that operate within a 900 MHz band. In such embodiments, a high power RF carrier in this band is utilized to provide power to the tags, and backscatter modulation is used for tag to reader communications, thereby allowing passive RFID tags to be read at farther ranges.

However, implementing a UHF real time locating system (RTLS) within an aircraft's reflective environment is not comparable to an RTLS system operating in an open environment. Specifically, RTLS performance within an aircraft environment, for the intended applications, includes achieving an accuracy of about +/−0.5 m. Such accuracy supports several applications where pinpoint location down to a single seat or seat-group is needed. Moreover, the density of nulls due to multipath RF propagation in a closed metal or composite aircraft tube is expected to be very different from RF propagation in an open office environment. Further complicating matters, for UHF-based RFID operation on global mobile platforms, the diversity of regulations (such as frequency and power) in the UHF band in various locales must be considered; while still meeting RTLS performance (accuracy & read-rate) goals in all cases. Simply put, certain countries have stringent power transmission limits within the UHF band.

Figure 1:
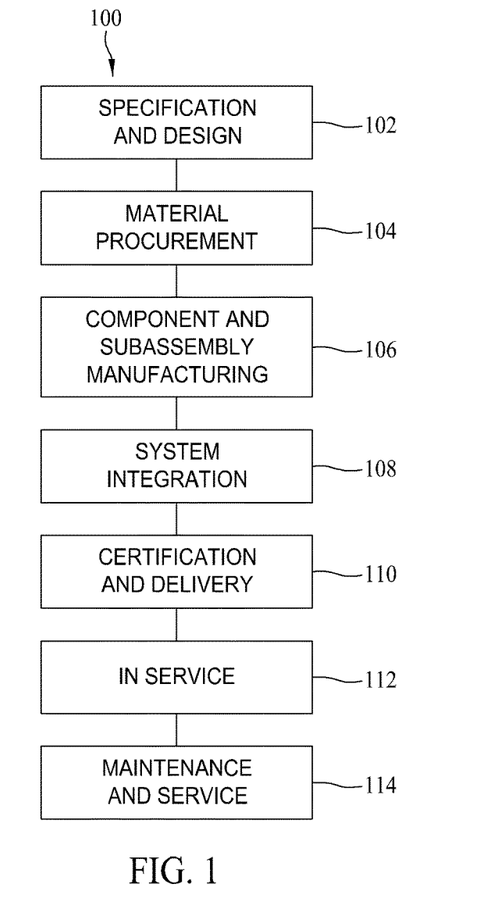
FIG. 1 is a flow diagram of an aircraft production and service methodology.
Figure 2:
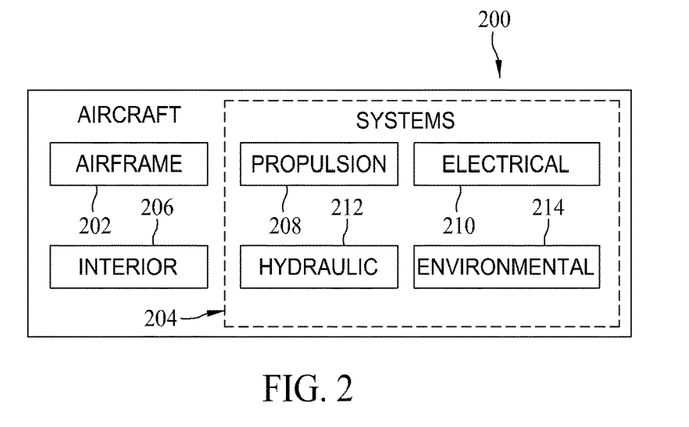
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
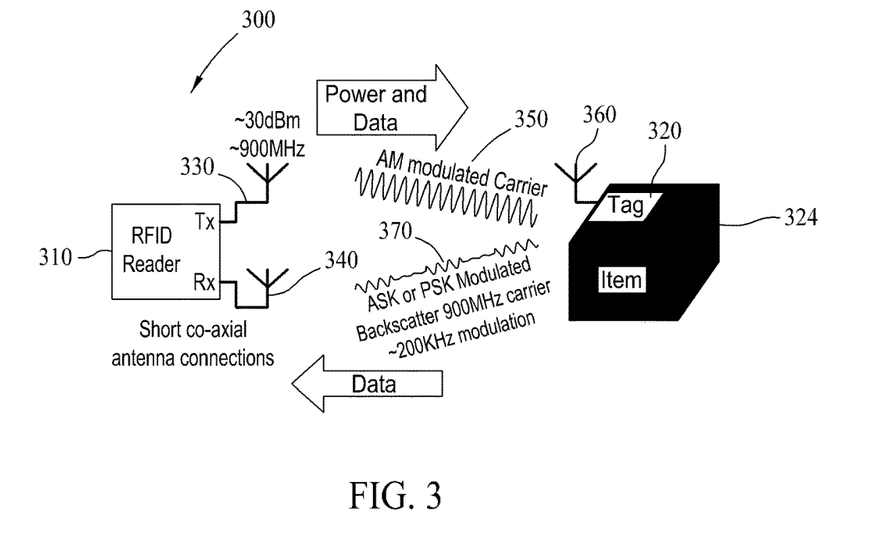
FIG. 3 is a block diagram of a passive RFID system.

FIG. 3 is a simple block diagram of a passive RFID system 300. System 300 includes an RFID reader 310 and at least one passive RFID tag 320 which is generally affixed to an item 324 whose existence and/or location within a particular area is to be verified. As shown, RFID reader 310 includes a transmission antenna 330 and a receiving antenna 340. In embodiments, antennas 330 and 340 may be a single antenna that is multiplexed. In operation, RFID reader 310 transmits a signal 350 that is generally at a specific frequency, the frequency being within a range that will cause the RFID tag 320 to resonate. Signal 350 is sometimes referred to as an activation signal. Signal 350 may be a modulated signal that carries data, such as an amplitude modulated signal at a carrier frequency. Signal 350 is transmitted at a specific power as well. As is known, when RFID tag 320 is caused to resonate by receiving signal 350 at an antenna 360 that is associated with RFID tag 320, it will in turn begin to transmit a signal 370, that can be received by the receiving antenna 340. Signal 370 includes data which can be interpreted by RFID reader 310. As shown in FIG. 3, the signal 370 may be an amplitude shift keying (ASK) modulated signal, a phase shift keying (PSK) modulated signal, or other type of modulated signal. RFID reader 310 is programmed such that receipt of signal 370 indicates one or more of an existence, location, or other identifier for item 324.

Figure 4:
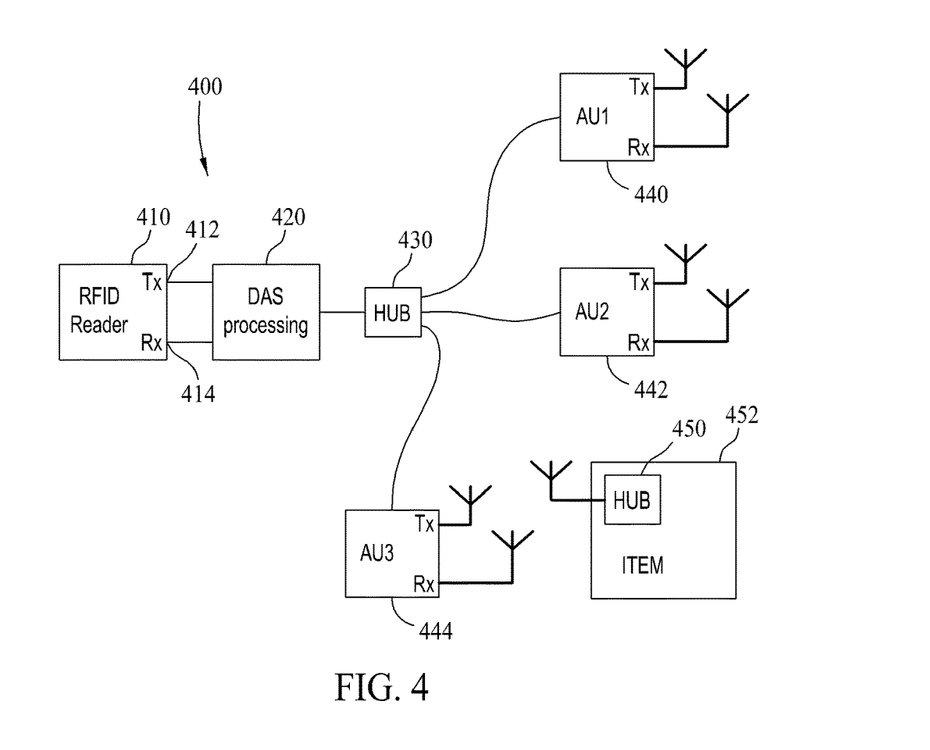
FIG. 4 is a block diagram of a passive RFID system that incorporates a distributed antenna system (DAS).

FIG. 4 is a block diagram of a passive RFID system 400 that incorporates a distributed antenna system (DAS). System 400 includes an RFID reader 410 whose transmission output 412 and receiver input 414 are coupled to a DAS processing function 420 which interfaces transmission output 412 and receiver input 414 to an antenna hub 430. Antenna hub 430 is communicatively coupled to antenna units 440, 442, and 444. Depending on their placement, any one, or multiple of antenna units 440, 442, and 444 may transmit signals to and receive signals from RFID tag 450 on item 452. By utilizing the distributed antenna system, improvement in RFID read rates and accuracy can be achieved as the range of the RFID readers is extended. In one embodiment, the received power is increased by up to 10 dB for an equivalent transmitted power. In addition, areas of antenna nulls can be reduced or eliminated. DAS and the elimination of nulls can improve read accuracy to 100%, as well as increasing the read rate and increasing the receiver power by a total of 15 dB. Such improvements lead to a ten fold increase in passive RFID tag read range, and lead to a ten fold increase in the velocity that can be measured for mobile passive RFID tags. Further, the incorporation of a DAS may provide a capability to transmit signals to and receive signals from a plurality of RFID tags 450 while the RFID reader is maintained in a single location. In many current applications, the RFID reader must be moved along a defined path so that signals emanating therefrom come into contact with RFID tags with sufficient power to cause the passive tag to resonate. While FIG. 4 and subsequent figures utilize an example of three antenna units within a distributed antenna system, those skilled in the art that the number of antenna units within a DAS is dependent upon the area to be covered by the antenna patterns, the transmission patterns of the antenna units themselves (e.g., the size and shape of nulls in the individual transmission patterns), and the available locations for deployment of antenna units.

Figure 5:
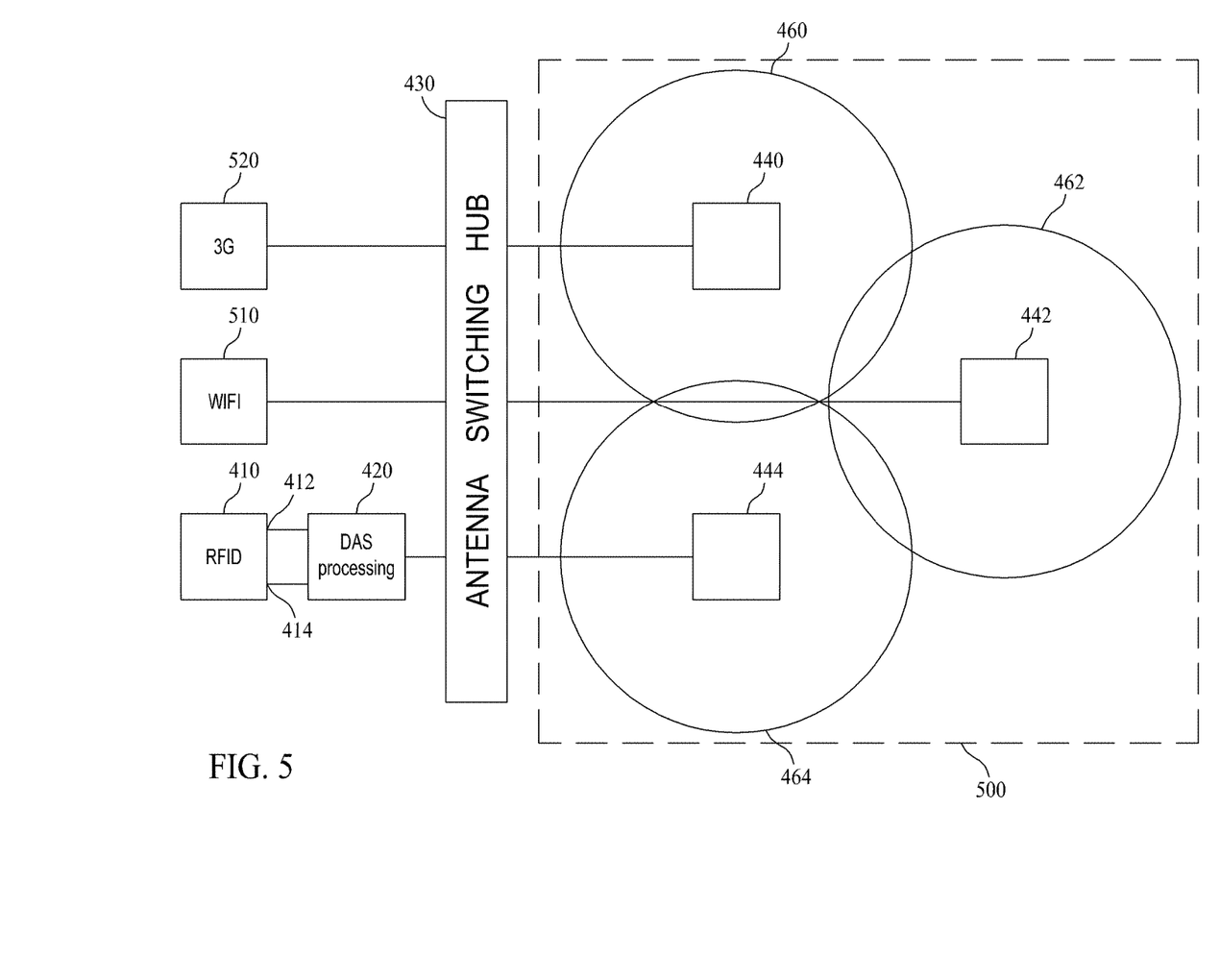
FIG. 5 is an illustration of transmission signals from antenna units deployed within an aircraft cabin or cargo area.

FIG. 5 is an illustration of transmission signals of antenna units 440, 442, and 444 deployed, for example, within an aircraft cabin or cargo area 500. Components utilized in FIG. 5 that could be common with those shown in FIG. 4 are illustrated using the same reference numerals. In embodiments, an antenna unit configuration, or distribution, could be deployed that provides coverage for one or more of an aircraft cabin, a cargo area, an aircraft mechanical equipment area, a wing or any other defined area that is associated with an aircraft.

In one aspect, FIG. 5 is provided to illustrate that antenna units 440, 442, and 444 each have a corresponding transmission pattern (460, 462, and 464 respectively) within which an RFID tag therein will be caused to resonate when the specific antenna unit is transmitting. FIG. 5 further illustrates that antenna units may be deployed such that an entire area may be covered by the transmission patterns so that all RFID tags within the area may be activated by a transmission from at least one of the antenna units. Specifically and as shown, antenna units 440, 442, and 444 may be placed so that the transmission patterns 460, 462, and 464 overlap to ensure coverage of an entire area. Finally, FIG. 5 illustrates that a distributed antenna system may be deployed to provide transmission and reception capabilities for multiple communications services. More specifically, the distributed antenna system may be utilized to support multiple of RFID communications with RFID reader 410, WiFi communications with WiFi unit 510, and cellular communications with 3G (or other) cellular communications unit 520. The RFID, WiFi, and cellular communications may be accomplished simultaneously through the system.

An optical-fiber distributed antenna system (DAS) employs several full duplex radio over fiber links to distribute analogue signals to a number of antenna units. For the downlink, signals are taken from an access point or base— station in the antenna switching hub 430 and used to directly control the bias current of a laser diode, resulting in light whose intensity is modulated by the RF signal. The optical signal is transmitted over fiber and detected by a photodiode in the antenna units 440, 442, and 444. The resulting RF signal is then amplified for wireless transmission. The uplink operates in a similar manner but in reverse such that within the antenna units 440, 442, and 444, the incoming RF signal is amplified and the resulting signal used to directly modulate a laser. Its optical output is then carried over the fiber back to the antenna switching hub 430. In one embodiment, the carrier between the antenna switching hub 430 and the antenna units 440, 442, and 444 is a single mode fiber. In one embodiment, the carrier between the antenna switching hub 430 and the antenna units 440, 442, and 444 is a multimode fiber. The analogue modulation of transverse-mode laser transmitters allows the use of high frequencies (beyond the 3 dB multi-mode bandwidth) to transmit information. The antenna units 440, 442, and 444 convert the optical signal to RF for wireless transmission. In one embodiment, the carrier between the antenna switching hub 430 and the antenna units 440, 442, and 444 is a coaxial cable. In one embodiment, antenna units 440, 442, and 444 amplify the RF signal prior to transmission. When multiple antenna units are utilized, total output power can be reduced and therefore the dynamic range of the optical links between the antenna switching hub 430 and antenna units 440, 442, and 444 can be reduced.

Certain distributed antenna systems may incorporate optical fiber communications and therefore provide a wide bandwidth that is capable of supporting all current communications services. In the aircraft application, the addition of an RFID function to such a common infrastructure overcomes many of the installation difficulties associated with the introduction of new "systems" on an aircraft (i.e., weight, space, cost, and increased fuel consumption because of weight).

As mentioned above, an accurate real time locating system that includes low cost, passive RFID tags onboard an aircraft enabled by a distributed antenna system (DAS) can locate, for example, passengers, baggage, confirm a full compliment of life vests, maintain an inventory of portable onboard items, and enable physical position location mapping of totally wireless electronic devices (sensors) to logical addresses for cabin services.

An RFID real time locating system can also be used in an aircraft in-flight entertainment system that includes a daisy chain of seat electronic boxes (SEBs) spaced throughout the aircraft, as an alternative to identifying a location of each SEB based upon passing of the registration token among the plurality of wired SEBs.

Figure 6:
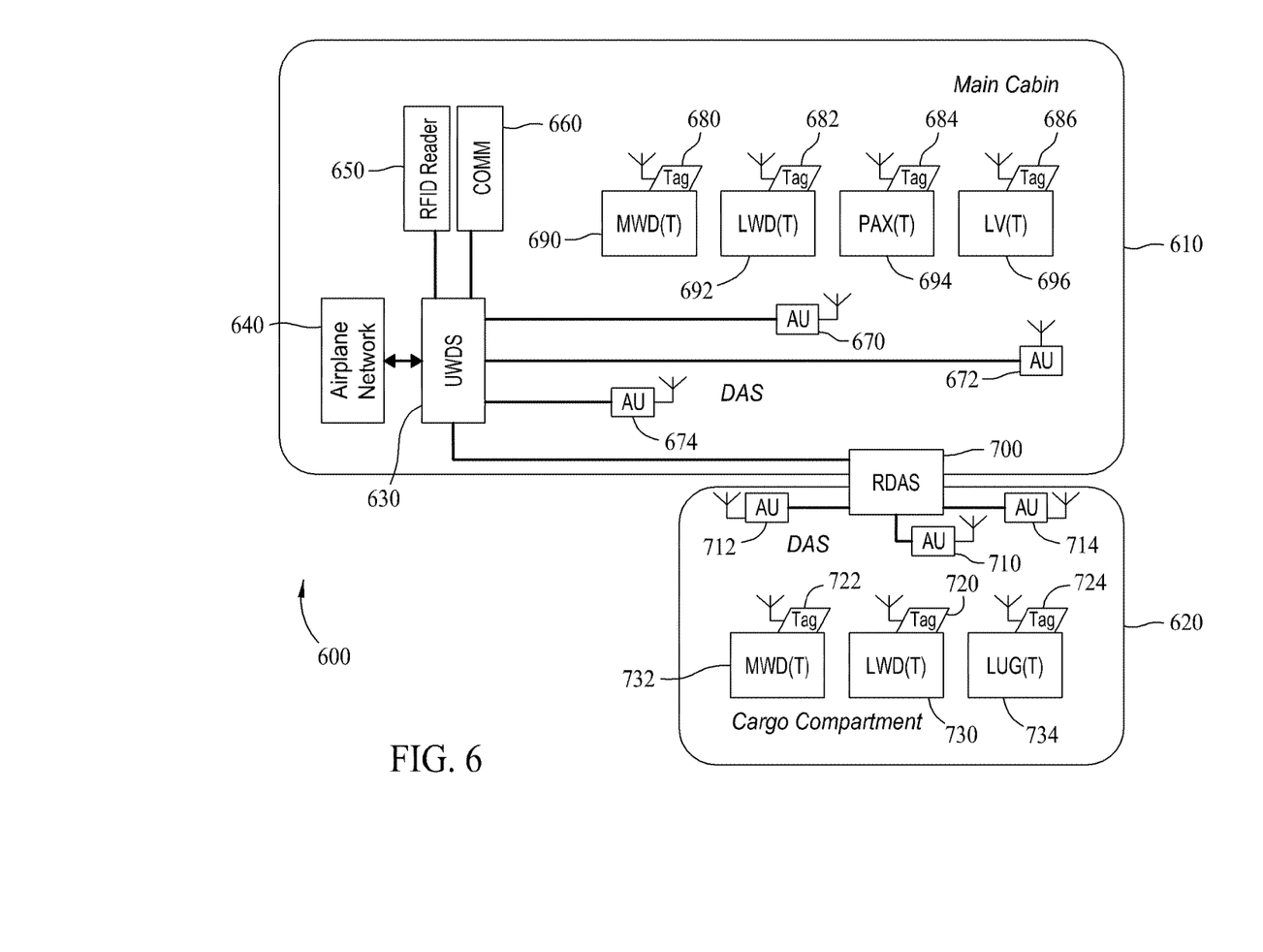
FIG. 6 is a depiction of a distributed antenna system (DAS) and a remote DAS deployed within an aircraft and utilized to communicate with a plurality of RFID tags.

Turning now to FIG. 6, one embodiment of a deployment within an aircraft 600 of a distributed antenna system (DAS) and a remote DAS utilized to communicate with a plurality of RFID tags is depicted. Aircraft 600 includes a main cabin 610 and a cargo compartment 620. In the illustrated embodiment, a universal wireless distribution system 630 is communicatively coupled to the airplane communications network 640. The universal wireless distribution system 630 performs the DAS processing function, embodied within a processor or other suitable processing device, and the antenna hub function described with respect to preceding figures. As such, it is communicatively coupled to RFID reader 650 and communications device 660. Communications device 660 represents the interface for WiFi and/or cellular communications. Similar to the depiction in FIG. 5, universal wireless distribution system 630 is coupled to antenna units 670, 672, and 674 which make up the DAS for the main cabin 610.

Within the aircraft cabin, antenna units 670, 672, and 674 provide a transmission capability to activate passive RFID tags 680, 682, 684, and 686. Respectively, these tags are coupled to mobile wireless devices 690, low-power wireless devices 692, passengers 694, and life vests 696. These representative examples of RFID tag deployment should be understood to be examples only. In certain embodiments, passengers may not be matched with an RFID tag, and other devices with an aircraft cabin may have an RFID tag attached thereto. In other words, which items are deployed with RFID tags are application specific. However, in any application, the tags may all be activated through the distributed antenna system of antenna units 670, 672, and 674, and the supporting components for such antenna units as is herein described. It should further be understood that there may be multiple of the individual items (e.g., life vests 696) each of which has a passive RFID tag attached thereto.

Universal wireless distribution system 630 is also coupled to a remote distributed antenna system controller 700, to which antenna units 710, 712, and 714 are coupled. Remote distributed antenna system controller 700 and antenna units 710, 712, and 714 are utilized to track RFID tags 720, 722, and 724 placed on items within cargo compartment 620. In the illustrated example, the respective items include a low-power wireless device 730, a mobile wireless device 732, and luggage 734. Again, these items are examples only, and many different items within main cabin 610, cargo compartment 620, and other areas of an aircraft may be tagged with a passive RFID tag and caused to be activated by a distributed antenna system similar to the ones shown in FIG. 6. Other remote DASs within other areas of an aircraft would also be communicatively coupled to, for example, RFID reader 650 and communications device 660 through universal wireless distribution system 630.

In one embodiment, the universal wireless distribution system 630 serves as a gateway between the wired airplane network 640 and the wireless airplane network by combining all wireless signals supporting a plurality of wireless systems, such as passenger internet connectivity, mobile phones, and distributed airplane functions.

The UWDS 630 outputs the combined signal via the distributed antenna system (DAS), which in one embodiment constitutes a leaky feeder coaxial antenna. Since a leaky coaxial distribution system offers an alternative to a distributed antenna system to support onboard aircraft communication services, the leaky coaxial distribution system also supports passive RFID real time location systems onboard aircraft when radiated through distributed antenna units.

The RDAS 700 is one embodiment of a wireless data concentrator, which may host airplane functions, or as shown, serve as wireless bridges for one or more low-power wireless devices (LWDs). These wireless data concentrators also provide extended wireless network coverage for supplicants outside the wireless network coverage area of the UWDS, such as outside the fuselage or in another airplane compartment. In embodiments, the wireless data concentrators form a wireless multi-hop relay network to increase availability, reliability, and network coverage. As a result, a plurality of mobile wireless devices, such as notebook computers and mobile phones (and MWDs 690 and 732), that are within wireless network coverage area of the UWDS 630 connect directly to the UWDS, or to one of the wireless data concentrators if outside the UWDS coverage area. In embodiments, a plurality of low power wireless devices, such as wireless sensors or switches, also connect to the network through the wireless data concentrators.

Figure 7:
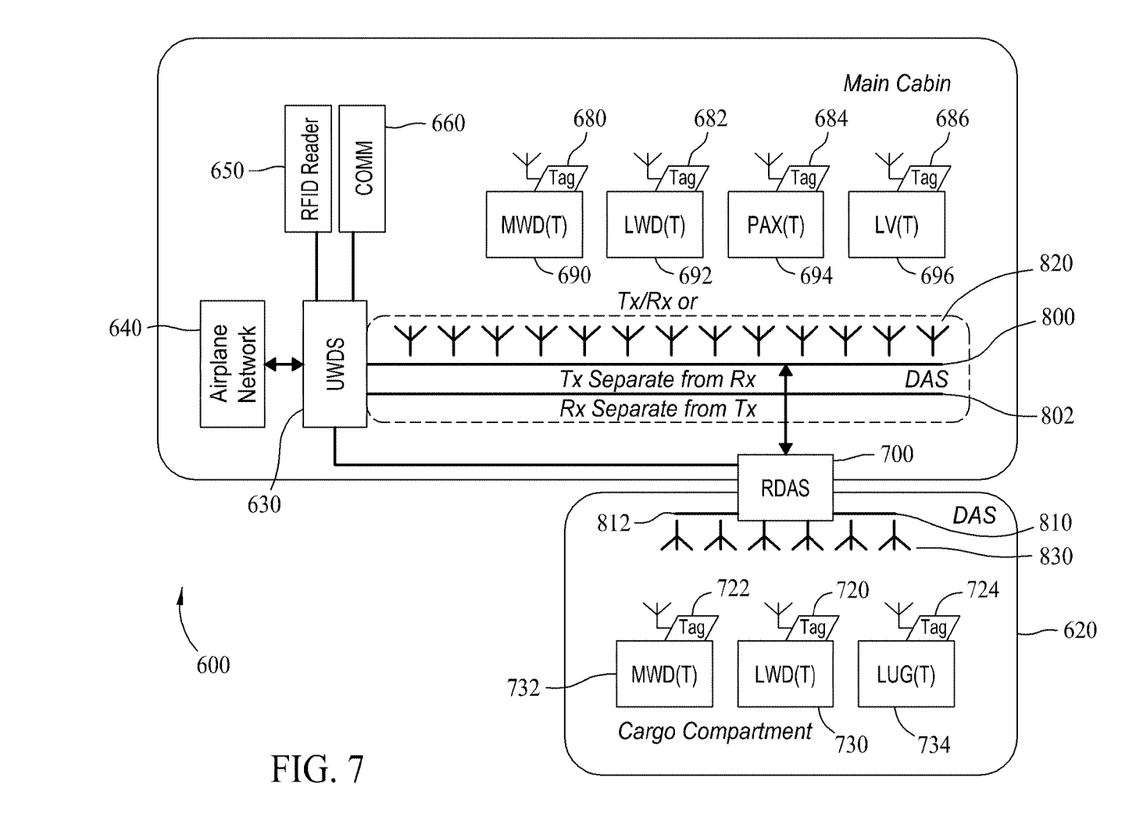
FIG. 7 is a depiction of a distributed antenna system (DAS) fabricated using leaky coaxial cable, deployed within an aircraft, and utilized to communicate with a plurality of RFID tags.

As illustrated in FIG. 7, leaky coaxial cables provide an alternative approach to a distributed antenna systems. A leaky coax cable is very similar to normal coaxial cable in its construction. However, one difference is in the outer conductor of the cable. Normal coaxial cables use outer conductor shields that are designed to minimize RF leakage. In contrast, the outer conductor of a typical leaky coaxial cable includes holes or openings formed in the outer conductor to allow a controlled amount of RF signal from the center conductor to leak out into the surrounding environment. Although most of the signal still travels through the cable, on the center conductor, these openings allow the signal to radiate out from the cable or currents to travel on the outer conductor surface, creating an RF field around the cable.

For either coupled-mode or radiated mode cable, a ray trace model that represents the cable as a sequence of "fluorescent-bulb" elements, each of which radiates diffusely, as depicted in FIG. 7, with a Lambert's-law radiation pattern is found to work well. The performance of leaky coaxial cable as a transmission and reception device depends on the environment in which it is installed. There are differences between coupling effects and insertion loss between and indoor and outdoor environments, and whether the leaky coaxial cable is laid in a rich scattering environment or a barren one. It is contemplated that RFID location methods demonstrated for distributed antenna systems will be tailored to the coupled mode characteristics for leaky coax cables in different environments.

FIG. 7 is an illustration of one embodiment of a deployment within an aircraft 600 of a first leaky coaxial cable 800 for transmission and a second leaky coaxial cable 802 for reception configured to operate as a distributed antenna system (DAS). Similar to the embodiment depicted in FIG. 6, a remote DAS 700 is also included that is utilized to communicate with a second plurality of RFID tags 720, 722, and 724 via additional leaky coaxial cables 810 and 812. In the illustrated embodiment, the universal wireless distribution system 630 is communicatively coupled to the airplane communications network 640 in the same manner as described above with respect to FIG. 6. In one embodiment, universal wireless distribution system 630 is coupled to a single leaky coaxial cable with frequencies or alternate means to prevent interference between uplink and downlink signals. In the illustrated embodiment, separate transmission and reception coaxial cable antenna units (800, 802, 810, and 812) are utilized. Through incorporation of the leaky coaxial cables 800 and 810 for transmission, multiple transmission points 820 and 830 are generated. Similarly, through incorporation of the leaky coaxial cables 802 and 812 for reception, multiple reception points 820 and 830 are generated. These transmission and reception points generally operate as the antenna units described above, and may be considered for purposes herein as "virtual antenna units", except that it is possible to easily generate additional transmission and reception points with the leaky coaxial cable as each point requires only an opening in the outer conductor of the coaxial cable. Adding additional antenna units such as those described with respect to FIG. 6 requires the space needed to house such units. In certain applications, such space is a premium.

The preceding figures are related to onboard passive RFID systems that include a distributed antenna system (DAS) with individual antenna unit locations optimized to reduce nulls and increase received signal strengths from the passive RFID tags. In other embodiments, leaky coaxial cable is utilized which in effect simulates a distributed antenna system. In embodiments, by utilizing the distributed antenna system, improvement in RFID read rates and accuracy can be achieved by extending the range of the RFID readers thereby increasing the received power by 10 dB for an equivalent transmitted power. In addition, areas of antenna nulls can be reduced or eliminated in both the DAS and leaky coaxial cable embodiments. DAS and the elimination of nulls can improve read accuracy to 100%, further increases the read rate, and increasing receiver power by a total of 15 dB. The combination of the preceding factors may result in an up to ten fold increase in passive RFID tag read range, and enable velocity measurements for mobile passive RFID tags.

The improvements for the passive RFID over DAS RFID receiver system arise when it is compared with a conventional RFID receiver system. The described RFID systems also allow for the identifying of items that include one or more passive RFID tags in a radio fingerprinted cabin. The incorporation of a DAS allows for the utilization of multiple antenna locating techniques to improve the absolute locating accuracy of the various passive RFID tags dispersed within an aircraft. In embodiments, the RFID systems provide a capability to provide a location of a passive RFID tag to within a single seat or seat group within an aircraft cabin. In dimension, a location can therefore be provided for a passive RFID tag to within about +/−0.5 meter. Further incorporation of a DAS also allows for the remote integration of other onboard HF, UHF, and SHF data services such as WiFi and cell phone over a common DAS infrastructure.

Prior locating systems are based on active RFID tags that are 100 times more costly per tag, require tag batteries, and have limited accuracy and resolution capabilities. In addition, the prior approaches to the mapping of physical locations for totally wireless devices, such as reading light control buttons in seat arms, use elaborate wired token bus passing schemes to map overhead reading light locations to passenger light control buttons on seat arms.

One problem with such an approach is that wired connections within an aircraft translate into increased aircraft weight which is generally undesirable. Therefore the described embodiments are better than prior solutions since no wiring is required to map physical locations to logical network locations. For locating items in real time, the embodiments illustrate the use of low cost, passive RFID tags to locate immobile items for inventory, maintain a position of mobile passengers, for example, with RFID tags printed on boarding passes, and for associating baggage with travel itineraries with passive RFID tag tagged luggage.

In summary, the described embodiments are useful for the identifying of items in a radio fingerprinted aircraft cabin, and incorporate multiple antenna locating techniques to improve the absolute locating accuracy of passive RFID tags to within a single seat or seat group (e.g., plus or minus one-half meter). The described systems also are useful for the remote integration of other onboard wireless data services such as WiFi and cell phone over a common DAS infrastructure.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft communications and item tracking system comprising:
   an RFID reader located at a first fixed location within an aircraft;
   a communications device located at a second fixed location within the aircraft; and
   a distributed antenna system comprising:
     a plurality of antenna units defining a wireless network and distributed throughout the aircraft, said plurality of antenna units respectively configured to:
       transmit a first radio frequency signal at a transmit power to activate a plurality of passive RFID tags within the aircraft in response to the first radio frequency signal; and
       receive a second radio frequency signal from at least one of the plurality of passive RFID tags at a receive power; and
     a wireless distribution system configured to communicatively couple to a wired network of the aircraft, said RFID reader, said communications device, and said plurality of antenna units, and further operable as a gateway for communication between said plurality of antenna units and said RFID reader, said communications device, and the wired network;
     wherein said RFID reader is configured to utilize physical locations of said plurality of antenna units to enable physical position location mapping of the plurality of passive RFID tags with plus or minus one half meter accuracy.

2. The system according to claim 1 wherein said distributed antenna system comprises respective optical fiber links coupling said plurality of antenna units to said wireless distribution system.

3. The system according to claim 1 wherein said system is configured to utilize the physical locations of said plurality of antenna units to map locations of wireless devices tagged with one or more of the plurality of passive RFID tags to logical network addresses.

4. The system according to claim 1 wherein said plurality of antenna units are disbursed within the aircraft to minimize areas of transmission nulls and increase the receive power throughout the aircraft.

5. The system according to claim 1 wherein said wireless distribution system is further configured for remote integration of onboard wireless data services associated with said communications device over said distributed antenna system, the onboard wireless data services including at least one of a WiFi communications capability and a cellular communications capability.

6. The system according to claim 1 wherein said wireless distribution system comprises an antenna hub, said wireless distribution system operable to interface transmission output from said RFID reader and receiver input to said RFID reader.

7. The system according to claim 1 further comprising:
a second plurality of passive RFID tags operable for association with items within a remote section of the aircraft;
a remote distributed antenna system controller; and
a second plurality of antenna units communicatively coupled to said remote distributed antenna system controller, said remote distributed antenna system controller communicatively coupled to said wireless distribution system, said remote distributed antenna system controller and said second plurality of antenna units operable for transmission and reception of signals associated with said RFID reader and with said second plurality of passive RFID tags.

8. The system according to claim 1 wherein said plurality of antenna units comprises at least one leaky coaxial cable comprising an outer conductor further comprising one or more openings within said outer conductor.

9. A method for tracking items on an aircraft, each item to be tracked associated with at least one passive RFID tag of a plurality of passive RFID tags, said method comprising:
transmitting an activation signal for activation of the plurality of passive RFID tags from a stationary RFID reader within the aircraft to a wireless distribution system configured to communicatively couple to a wired network of the aircraft, the stationary RFID reader, a communications device, and a plurality of antenna units, and further operable as a gateway for communication between the plurality of antenna units and the stationary RFID reader, the communications device, and the wired network;
routing the activation signal from the wireless distribution system for transmission through the plurality of antenna units distributed throughout the aircraft at a transmit power;
routing at least one other communication signal among the communication device and the plurality of antenna units;
receiving, via the plurality of antenna units, signals generated by the plurality of passive RFID tags activated by the transmitted activation signal, wherein the signals are received at a receive power;
routing the received signals through the wireless distribution system to the stationary RFID reader for interpretation by the stationary RFID reader; and
generating a physical position location map of the plurality of passive RFID tags with plus or minus one half meter accuracy based on physical locations of the plurality of antenna units.

10. The method according to claim 9 wherein routing the activation signal from the wireless distribution system to the plurality of antenna units comprises routing the activation signal over respective optical fiber links coupling the plurality of antenna units to the wireless distribution system.

11. The method according to claim 9 further comprising utilizing the physical locations of the plurality of antenna units to map locations of RFID tagged devices to logical network addresses.

12. The method according to claim 9 further comprising disbursing the plurality of antenna units within the aircraft to minimize areas of transmission nulls and increase the receive power of the signals received from the passive RFID tags throughout the aircraft.

13. The method according to claim 9 wherein routing the at least one other communication signal comprises routing at least one of a WiFi communications signal and a cellular communications signal.

14. An aircraft comprising:
an RFID reader;
a plurality of passive RFID tags distributed throughout said aircraft;
a communications device configured to provide a communication service;
a wired network;
a plurality of antenna units defining a wireless network and distributed throughout the aircraft, said plurality of antenna units respectively configured to:
transmit a first radio frequency signal at a transmit power to activate the plurality of passive RFID tags in response to the first radio frequency signal; and
receive a second radio frequency signal from at least one of the plurality of passive RFID tags at a receive power; and
a wireless distribution system configured to communicatively couple said wired network, said RFID reader, said communications device, and said plurality of antenna units, and further operable as a gateway for communication between said plurality of antenna units and said RFID reader, said communications device, and said wired network;
wherein said RFID reader is configured to utilize physical locations of said plurality of antenna units to enable physical position location mapping of the plurality of passive RFID tags with plus or minus one half meter accuracy.

15. The aircraft according to claim 14 wherein said wireless distribution system is operable to modulate a plurality of optical signals received from at least one of said RFID reader, said communications device, and said wired network.

16. The aircraft according to claim 14 wherein said communications device is further configured to provide at least one of WiFi and cellular communications services over said wireless distribution system and said plurality of antenna units.

17. The aircraft according to claim 16 wherein RFID, WiFi and cellular communications are accomplished simultaneously through said wireless distribution system.

18. The aircraft according to claim 14 said plurality of passive RFID tags are deployed on components of said aircraft, said RFID reader operable to interrogate said plurality of passive RFID tags via said wireless distribution system and said plurality of antenna units to determine a component inventory for said aircraft.

19. The aircraft according to claim 18 wherein said RFID reader and said plurality of passive RFID tags utilize backscatter modulation for passive RFID tag to RFID reader communications.

20. The aircraft according to claim 14 wherein said plurality of antenna units are operable to convert an optical signal from said wireless distribution system to RF for wireless transmission.

21. The aircraft according to claim 20 wherein a number of said plurality of antenna units deployed within said aircraft defines:
 an output power for individual ones of said plurality of antenna units; and
 a dynamic range of respective optical links between said wireless distribution system and said plurality of antenna units.

22. The aircraft according to claim 20 wherein a communicative coupling between said plurality of antenna units and said wireless distribution system comprises at least one of multimode fiber and coaxial cable.

23. The aircraft according to claim 14 wherein said plurality of antenna units comprises openings in an outer conductor of leaky coaxial cable.

24. The aircraft according to claim 14 wherein said RFID reader is operable to support real time location of said plurality of passive RFID tags deployed on said aircraft.

25. The aircraft according to claim 14 further comprising a wireless data concentrator communicatively coupled to said wireless distribution system, said wireless data concentrator operable for communication with a second plurality of antenna units.

26. The aircraft according to claim 14 wherein said wireless distribution system is further operable as the gateway for distributed airplane functions.

* * * * *